United States Patent
Ramachandra

(10) Patent No.: US 9,673,926 B2
(45) Date of Patent: Jun. 6, 2017

(54) DETERMINING PRESENTATION TIME IN AVB NETWORKS

(71) Applicant: Harman International Industries, Incorporated, Stamford, CT (US)

(72) Inventor: Nagaprasad Ramachandra, Bangalore (IN)

(73) Assignee: Harman International Industries, Incorporated, Stamford, CT (US)

(*) Notice: Subject to any disclaimer, the term of this patent is extended or adjusted under 35 U.S.C. 154(b) by 69 days.

(21) Appl. No.: 14/578,022

(22) Filed: Dec. 19, 2014

(65) Prior Publication Data

US 2016/0182176 A1   Jun. 23, 2016

(51) Int. Cl.
*H04J 3/06* (2006.01)
*H04L 29/06* (2006.01)

(52) U.S. Cl.
CPC .......... *H04J 3/0661* (2013.01); *H04L 65/605* (2013.01); *H04L 65/607* (2013.01); *H04L 65/80* (2013.01); *H04L 69/28* (2013.01)

(58) Field of Classification Search
None
See application file for complete search history.

(56) References Cited

U.S. PATENT DOCUMENTS

| | | | |
|---|---|---|---|
| 2010/0189206 A1* | 7/2010 | Kagan | H04J 3/0697 375/354 |
| 2010/0235486 A1* | 9/2010 | White | H04L 43/0858 709/223 |
| 2012/0263263 A1* | 10/2012 | Olsen | H04L 67/16 375/354 |
| 2013/0138800 A1* | 5/2013 | Gelter | H04N 21/64738 709/224 |
| 2015/0245306 A1* | 8/2015 | Boehlke | H04W 56/001 370/350 |

OTHER PUBLICATIONS

IEEE Standards Association, IEEE Standard for Local and metropolitan area networks—Timing and Synchronization for Time-Sensitive Applications in Bridged Local Area Networks, Mar. 30, 2011, 292 pages.
IEEE Standards Association, IEEE Standard for Local and metropolitan area networks—Audio Video Bridging (AVB) Systems, Sep. 30, 2011, 45 pages.
IEEE Standards Association, IEEE Standard for Local and metropolitan area networks—Media Access Control (MAC) Bridges and Virtual Bridge Local Area Networks, Aug. 31, 2011, 1,365 pages (submitted in two parts).
IEEE Standards Association, IEEE Standard for Layer 2 Transport Protocol for Time-Sensitive Applications in Bridged Local Area Networks, May 6, 2011, 57 pages.

* cited by examiner

*Primary Examiner* — Edan Orgad
*Assistant Examiner* — Saumit Shah
(74) *Attorney, Agent, or Firm* — McCoy Russell LLP

(57) ABSTRACT

Embodiments are disclosed for a device for determining a presentation time for a generated packet. An example device includes a communication interface communicatively connectable to another device and configured to transmit data, a processor, and a storage device that stores instructions executable by the processor to receive a stream packet, extract a timestamp from the stream packet, and add one or more offsets to the extracted timestamp to determine a presentation time. The instructions are further executable to transmit a generated packet, the generated packet including an indication of the determined presentation time.

12 Claims, 5 Drawing Sheets

DETERMINING PRESENTATION TIME IN AVB NETWORKS

FIELD

The disclosure relates to determining a presentation time for a packet in an AVB network.

BACKGROUND

Audio Video Bridging (AVB) is a networking protocol pertaining to streaming audio and/or video data via a network (e.g., an Ethernet network), described in IEEE 802.1 standards (e.g., IEEE802.1BA-2011, IEEE 802.1Q-2011, IEEE 802.1AS-2011, etc.). An AVB network may include one or more talkers (e.g., transmitters) and one or more listeners (e.g., receivers) for transmitting and receiving audio/video data according to the Audio/video transport protocol (AVTP), described in the IEEE 1722-2011 standard.

SUMMARY

In an AVB network a source stream of data may be configured to carry packets including a timestamp indicating a presentation time. The presentation time indicates a time at which the packet is to be played back. The effect of a packet not being played back at an expected time may include playback that features undesirable effects such as audio distortion and/or audio/video mismatch. In some systems, a precision time protocol (PTP) stack may be maintained at a talker device that generates an audio/video data stream in order to maintain time synchronization across the network. In such example systems, one or more handshaking routines may be performed before and/or during transmission of the audio/video stream to ensure time synchronization and establish presentation times.

The disclosure provides methods and systems for determining presentation time for a packet generated at a talker device. In order to avoid maintaining a PTP stack at the talker device and/or the listener device, the talker device may determine the presentation time based on a timestamp in a received clock reference packet and/or a 1722a stream packet. By adding one or more offsets based on the type of packet received at the talker device, the time indicated by the timestamp in the packet may be converted to a presentation time for the packet. Removing the PTP stack from the talker device may reduce hardware complexities and reduce handshake operations for maintaining the integrity of the PTP stack.

In some embodiments, a device for determining a presentation time for a generated packet includes a communication interface communicatively connectable to another device and configured to transmit data, a processor, and a storage device that stores instructions executable by the processor to receive a stream packet, extract a timestamp from the stream packet, and add one or more offsets to the extracted timestamp to determine a presentation time. The instructions are further executable to transmit a generated packet, the generated packet including an indication of the determined presentation time.

In some embodiments, a communication system includes a talker device including a transmission buffer for storing audio/video data blocks for transmission, and a timing module including instructions executable by a processor of the talker device to determine a presentation time for a generated packet based on a timestamp extracted from a received packet and adjusted by one or more offsets. The example communication system further includes a listener device communicatively connected to the talker device and configured to receive the generated packet from the talker device.

According to some embodiments, an example method for determining a presentation time for a generated packet includes receiving a stream packet at a talker device, extracting a timestamp from the received stream packet, and adding one or more offsets to the extracted timestamp to determine the presentation time. The example method further includes transmitting the generated packet including an indication of the determined presentation time.

BRIEF DESCRIPTION OF THE DRAWINGS

The disclosure may be better understood from reading the following description of non-limiting embodiments, with reference to the attached drawings, wherein below.

DETAILED DESCRIPTION

As described above, a communication system may include talker and listener devices. The listener devices may receive audio/video streams from the talker devices and playback each received packet of the audio/video streams at a time specified by a presentation time timestamp in packets of the audio/video streams. However, the presentation time may only be valid if the listener device is time synchronized with the talker device. In order to ensure that the listener is able to playback the audio/video data properly without complicated time synchronization processes, the talker device may determine a presentation time based on a timestamp included in a received stream packet and adjusted by one or more offsets. The determination of a presentation time for transmitted packets is described in more detail below.

Figure 1:
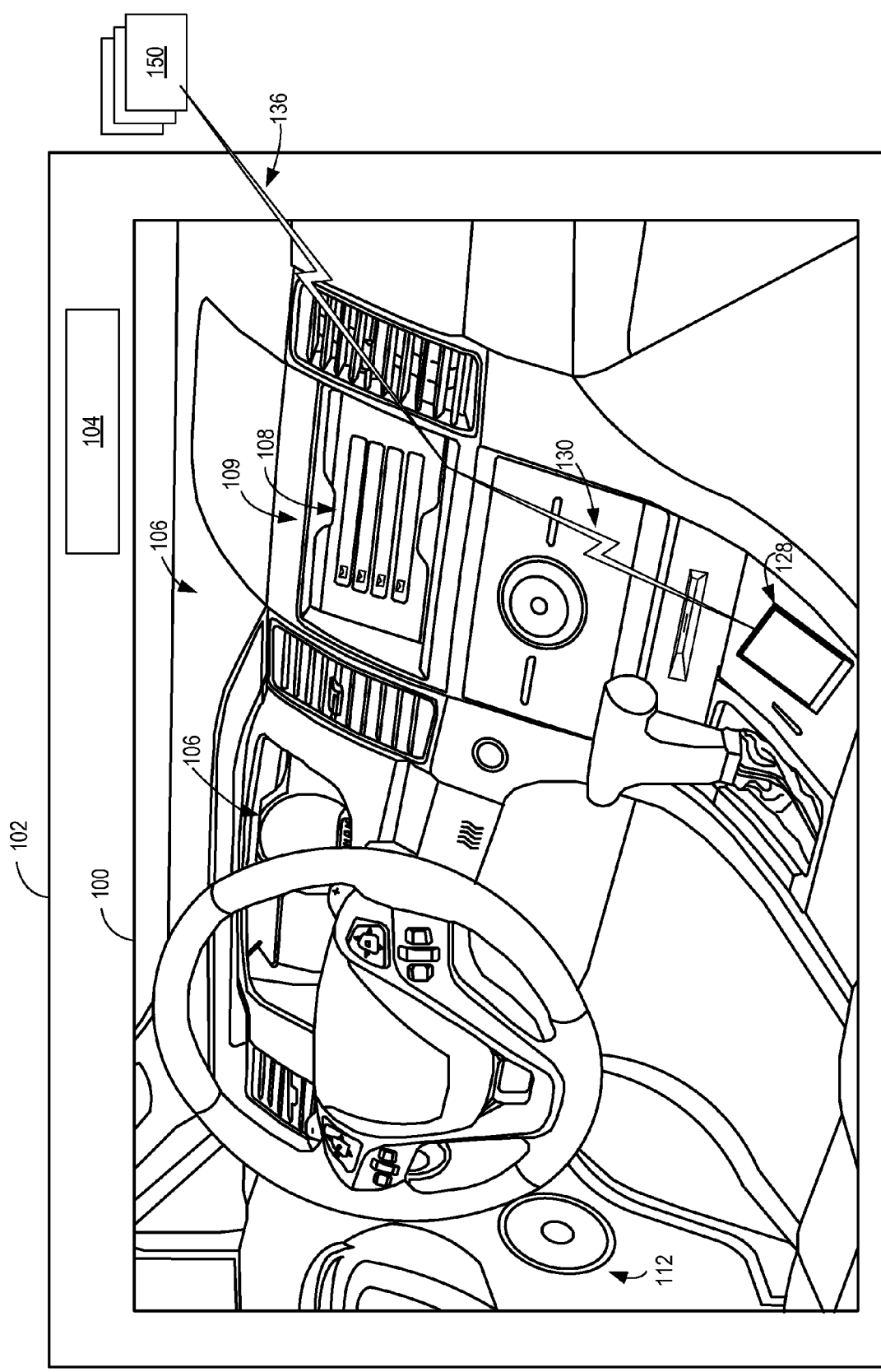
FIG. 1 shows an example partial view of a vehicle cabin in accordance with one or more embodiments of the present disclosure.

FIG. 1 shows an example partial view of one type of environment for a communication system: an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as from sensors coupled to external devices 150 and/or mobile device 128.

Cabin 100 may also include one or more user objects, such as mobile device 128, that are stored in the vehicle before, during, and/or after travelling. The mobile device may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices 150 are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smart-watch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

In the example environment illustrated in FIG. 1, the in-vehicle computing system 109 may be connected to one or more vehicle systems, such as speakers 112, display 108, vehicle sensors, and/or other suitable vehicle systems via any suitable network. In some examples, the in-vehicle computing system 109 includes a talker device configured to transmit audio/video data to listener devices, such as speakers 112 and display 108 via a network. The network may be configured in accordance with Layer 2 of the Open Systems Interconnection (OSI) model, in which routing and forwarding decisions or determinations in the network may be performed on a media access control (MAC) addressing basis. An example Layer 2 network may be an Ethernet Audio/Video Bridging (AVB) network. For Layer 2 networks configured as AVB networks, the talkers and the listeners may be configured to communicate over the AVB network using various AVB standards and protocols, including the Institute of Electrical and Electronics Engineers (IEEE) 802.1AS-2011 (gPTP) for network timing and synchronization, IEEE 802.1Q-2011 clause 34 for queuing and forwarding streaming data, IEEE 802.1Q-2011 clause 35 (Stream Reservation Protocol (SRP)) for reserving a network connection or path and/or resources such as bandwidth for communication over the network connection, and/or IEEE 1722-2011 related to a possible data streaming format. Other AVB-related standards and protocols, and/or other versions of the AVB standards and protocols, previously, currently, or later developed, may also or alternatively be used.

The in-vehicle computing system may stream audio/video data based on information stored in local storage and/or audio/video data received from mobile device 128 and/or external device(s) 150. Transmitting audio/video data having a proper number of sample chunks within each packet may ensure that the audio/video data is presenting via the speakers 112 and/or display 108 at a proper media rate (e.g., without audio distortions that may arise from samples being skipped or played too early/late).

It is to be understood that FIG. 1 depicts one example environment, however the communication systems and methods described herein may be utilized in any suitable environment. As another example, speakers in a professional audio environment (e.g., an arena, stadium, concert hall, amphitheater, recording studio, etc.) may be utilized as listeners that receive audio data from a talker device (e.g., a mixing console, audio/video receiver, etc.) over an AVB network. Any suitable devices that transmit and/or receive packets may be utilized as the systems and/or to perform the methods described herein.

Figure 2:
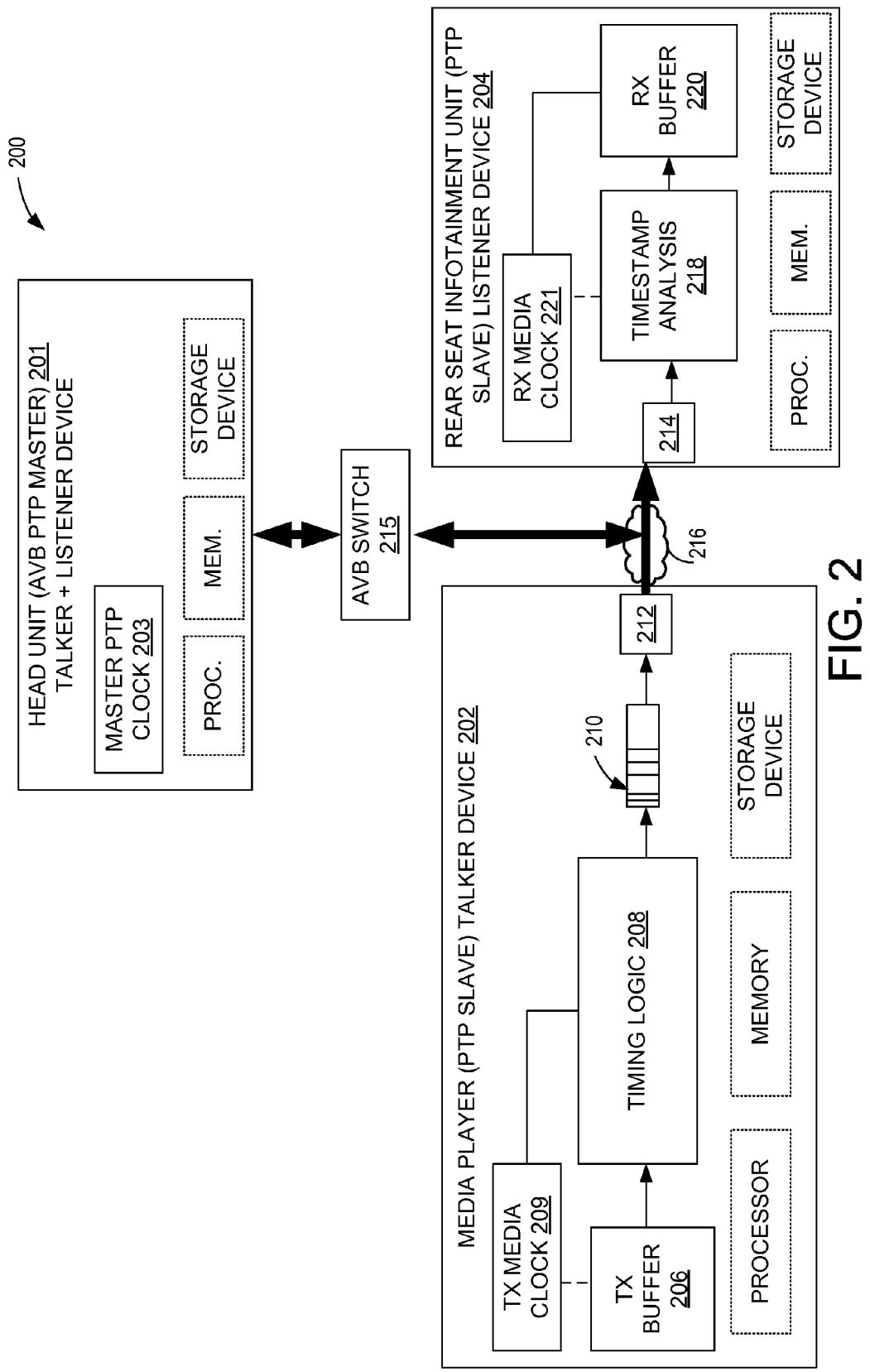
FIG. 2 shows an example communication system in accordance with one or more embodiments of the present disclosure.
Figure 3:
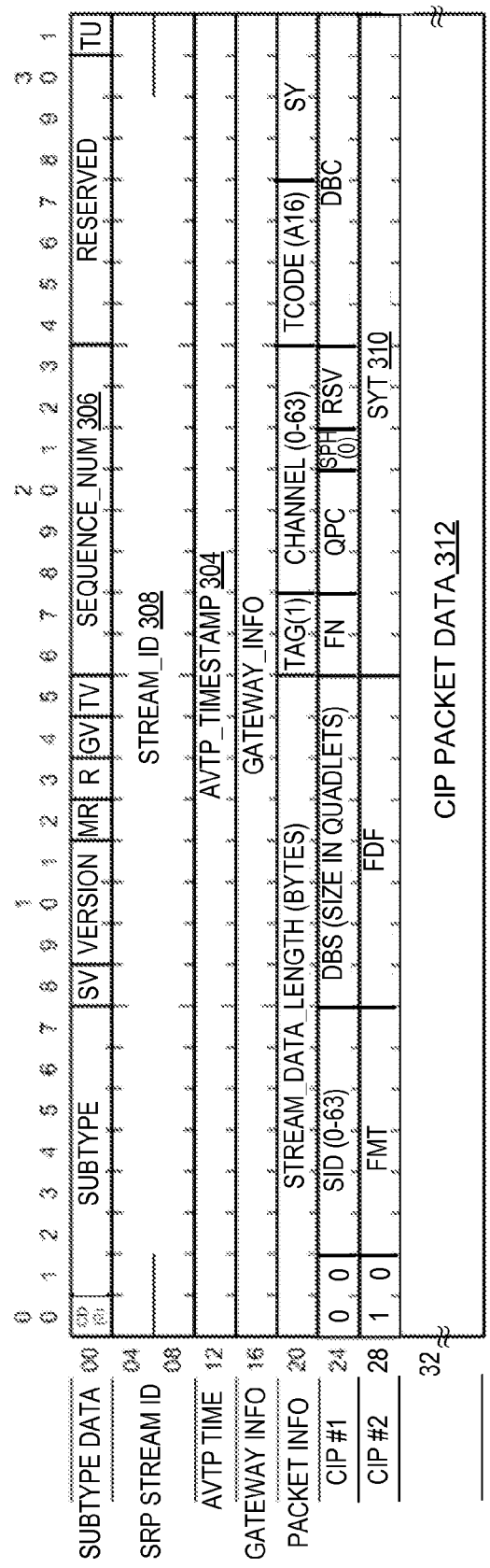
FIG. 3 shows an example packet structure in accordance with one or more embodiments of the present disclosure.

FIG. 2 is an example communication system 200 including an AVB PTP master device 201 (e.g., a head unit in a vehicle), a talker 202 (e.g., a media player in the vehicle), and a listener 204 (e.g., a rear seat infotainment unit in the vehicle). As described above, talker 202 may be any suitable device for sending an audio/video stream to listener 204 and listener 204 may be any suitable device for receiving and playing back the audio/video stream. For example, AVB PTP master device 201 may correspond to a remotely located server device, talker 202 may correspond to in-vehicle computing system 109, and listener 204 may correspond to speakers 112 and/or display 108 of FIG. 1 in other examples. The AVB PTP master device 201 includes a master PTP clock 203, which maintains a clock signal representing a current PTP time at the AVB PTP master device. As illustrated, talker 202 may include a transmission buffer 206 configured to store data blocks of an audio/video stream. For example, if the audio/video stream is supplied from an external device (e.g., external device 150 and/or mobile device 128 of FIG. 1 and/or PTP master device 201), the received data may be stored in transmission buffer 206 until the data is ready to be processed by timing logic 208. Timing logic may be a module including instructions executable by a processor of talker 202 for determining a timestamp to be included in a packet of an audio/video data stream transmitted from the talker device. The time indicated by the determined timestamp may be calculated based on a clock reference signal from the AVB PTP master device 201 and/or from a time indicated by an AVTP (e.g., 1722a) stream packet received at the talker device 202. Methods for determining the timestamp are described below with respect to FIGS. 4 and 5. A packet 210 including the determined timestamp may be generated by the timing logic 208 and/or one or more other suitable modules of talker 202, such as a packetizer, communication interface 212, etc.). The module(s) may encapsulate one or more samples of audio/video data (e.g., for an AVTP stream) in the packet 210 including header information indicating a presentation time. An example packet structure is illustrated in FIG. 3 and described in more detail below.

The packet 210 may be transmitted from talker 202 (e.g., via a talker communication interface 212) to a listener 204 (e.g., via a listener communication interface 214) over a network (e.g., an AVB network 216). Although illustrated between the AVB PTP master device 201 and the talker/listener devices 202/204, it is to be understood that AVB switch 215 may represent one or more AVB switches located within the AVB network 216 and controlling the routing of communication data throughout the network. Accordingly, talker communication interface 212 and listener communication interface 214 may be configured to communicate via an AVB network (e.g., via the audio/video transport protocol, AVTP). Packet 210, as received at listener 204, may be provided to a timestamp analysis module 218. Timestamp analysis module 218 may include instructions executable by a processor of listener 204 to evaluate the header of received packets (e.g., of packet 210) to determine a value of a timestamp within the packet. The packet is stored at receive buffer 220 in an index that is based on the presentation time included in the packet. The listener 204 may play out audio/video data from receive buffer 220 based on the index at which each data block is stored and/or when a receive media clock 221 of the listener reaches the presentation time indicated for a given data block.

In some examples, the presentation time may be utilized to synchronize the receive media clock 221 with the transmission media clock 209. For example, if the network delay (e.g., the max transit time) is known by both the talker and the listener, the listener may compare a receive time with an expected receive time (e.g., based on a known transmission delay and the presentation time) and adjust the receive media clock based on a calculated error (e.g., the difference between the measured receive time and the expected receive time).

It is to be understood that one or more of the components of talker 202 and listener 204 may include and/or be included in a processor and/or storage device of talker 202 and listener 204. For example, although a processor/memory/storage device is illustrated separately within talker 202 and listener 204, it is to be understood that transmission buffer 206 may include at least a portion of a storage device of talker 202, and timing logic 208 may include instructions stored in the storage device of talker 202 and/or a processor for executing the instructions stored in the storage device of talker 202. Likewise, receive buffer 220 may include at least a portion of a storage device of listener 204, and timestamp analysis module 218 may include instructions stored in the storage device of listener 204 and/or a processor for executing the instructions stored in the storage device of listener 204.

FIG. 3 illustrates an example packet 300 including a presentation time (e.g., AVTP_TIMESTAMP field 304). The timestamp included in the AVTP_TIMESTAMP field 304 (e.g., the data stored in this portion of the header) may be calculated/determined as described in one or more of FIGS. 4 and 5 below. For example, packet 300 may illustrate an example structure of packet 210 of FIG. 2. Other fields of note may include the SEQUENCE_NUM field 306, which may indicate a place of the packet in the audio/video stream (e.g., how many packets were sent before that packet in the current audio/video stream). STREAM_ID field 308 may indicate an identifier for the stream, which designates the stream to which the packet belongs. As described above, AVTP_TIMESTAMP field 304 indicates a time at which the packet is to be played back (e.g., a real time and/or a time that is reachable by a media clock of a listener). SYT field 310 may indicate a SYT_INTERVAL, which denotes the number of data blocks between two successive valid AVTP_TIMESTAMP fields. CIP PACKET DATA field 312 may include the payload of the packet (e.g., while each of the other fields illustrated in FIG. 3 and/or described above make up the header of the packet). For example, CIP PACKET DATA field 312 may include the audio/video data blocks/samples to be played back at the time indicated in the AVTP_TIMESTAMP field 304.

Figure 4:
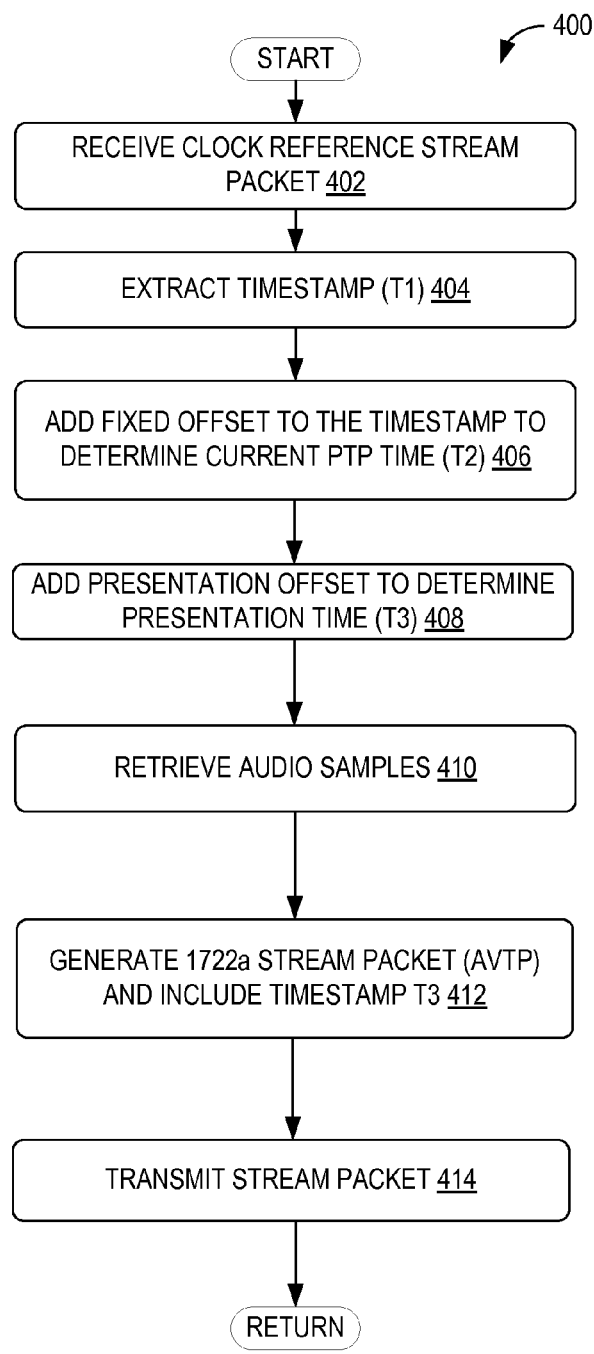
FIG. 4 is a flow chart for an example method of determining a presentation time based on a received clock reference packet.

FIG. 4 is a flow chart of a method 400 for determining timestamps for a packet. For example, method 400 may be performed at each iteration or interval at which a packet is generated at a talker device for transmission to a listener device. Method 400 may be performed by any suitable transmission device, such as talker device 202 of FIG. 2. At 402, method 400 includes receiving a clock reference stream packet. For example, the clock reference stream packet may be received from a PTP master device, such as device 201 of FIG. 2. At 404, the method includes extracting a timestamp (timestamp T1) from the received clock reference stream packet. For example, the extracted timestamp may represent a transmission time at which the packet was transmitted from the PTP master device (e.g., AVB PTP master device 201 of FIG. 2, the transmission time being based on the master PTP clock of the PTP master device).

At 406, method 400 includes adding a fixed offset to the timestamp (T1) to determine a current PTP time (T2). For example, the fixed offset may be a stored value (e.g., stored at the talker device) representing a worst case delay throughout the network and/or a measured delay between the PTP master device and the talker device. In other examples, the fixed offset may be included in the clock reference stream packet and/or another packet received prior to the clock reference stream packet. At 408, method 400 includes adding a presentation offset to determine a presentation time (T3). For example, the presentation offset may be a stored value (e.g., stored at the talker device) representing a processing delay and/or other delays experienced between receiving a packet and playing back the packet. In some embodiments, the presentation offset may be a sum of a delay representing a worst case network delay (e.g., a maximum transit time) between the PTP master device and another device (e.g., another device receiving a content stream from the talker) in the network (e.g., the device having the longest network delay associated therewith) and a worst-case processing delay (e.g., for processing in the talker device and/or in the listener device). The presentation offset may be added to the current PTP time (T2) to determine the presentation time (T3).

At 410, method 400 includes retrieving audio samples. For example, the audio samples may be retrieved from packets sent from the PTP master device and/or another audio source device in the network. Retrieving audio samples may include receiving packets including the audio samples and/or extracting the audio samples from the received packets.

At 412, the method includes generating a 1722a stream packet (e.g., an AVTP packet) including a timestamp representing presentation time T3. For example, the stream packet may be generated including one or more of the retrieved audio samples and the presentation time T3. At 414, the method includes transmitting the generated stream packet. For example, the stream packet may be transmitted to a listener device, such as listener device 204 of FIG. 2.

Figure 5:
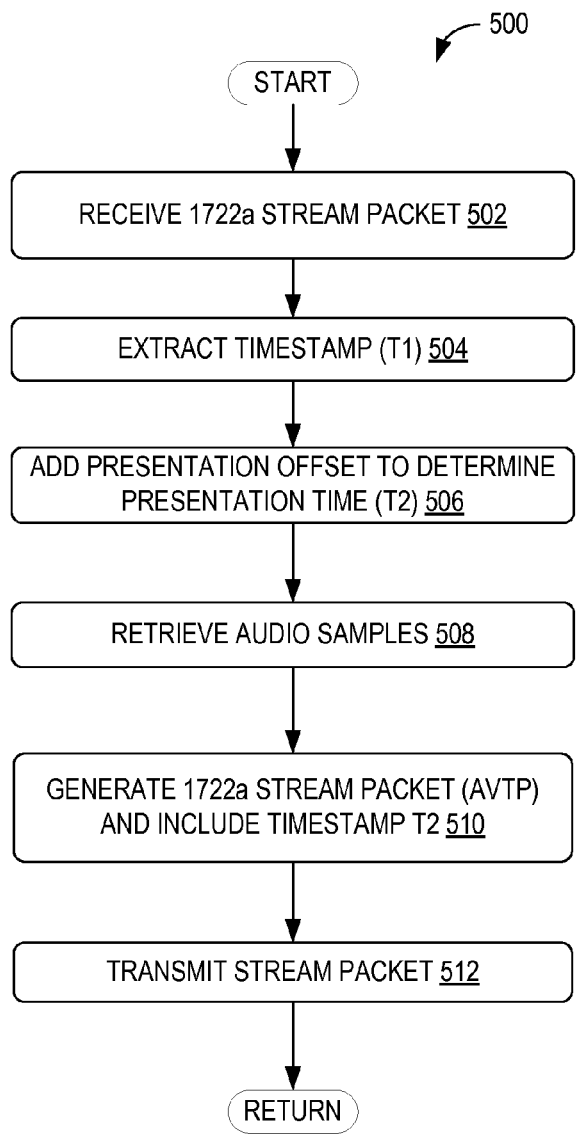
FIG. 5 is a flow chart for an example method of determining a presentation time based on a received 1722a packet.

In some examples, a presentation time may be determined from a received 1722a AVTP stream packet, rather than a clock reference packet. In such examples, a current time may already be indicated by the received packet, resulting in the ability to forego determining a current PTP time. FIG. 5 is a flow chart of a method 500 for determining a presentation time with a timestamp extracted from a 1722a AVTP stream. At 502, the method includes receiving the 1722a stream packet. At 504, the method includes extracting a timestamp (T1) from the received packet. As described above, the timestamp (T1) within the 1722a stream packet may approximate a current PTP time. Accordingly, at 506, the method includes adding a presentation offset to determine the presentation time (T2). The presentation offset may be determined and/or stored as described above with respect to FIG. 4. Accordingly, the only offset applied during execution of method 500 is the presentation offset, and the fixed PTP offset described above with respect to FIG. 4 is not applied when determining presentation time.

At 508, the method includes retrieving audio samples. At 510, the method includes generating a 1722a stream packet (e.g., an AVTP packet) including a timestamp indicating the presentation time (T2). At 510, the method includes transmitting the stream packet. In this way, the presentation time may be determined in fewer stages when establishing a current PTP time from a 1722a stream packet, rather than a clock reference packet.

In each of the methods 400 and 500 of FIGS. 4 and 5, respectively, the talker device that generates and transmits a packet including a presentation time does not include a PTP stack for maintaining a PTP time. Instead, the PTP time is gleaned from the reference clock stream and/or the presentation time is determined based on a current PTP time indicated by a 1722a stream packet received at the talker device. In this way, the added hardware and logic associated with maintaining a PTP stack may be removed and/or not included in the talker device, reducing complexity of the talker device in comparison with devices that include a PTP stack.

By determining a presentation time for inclusion in a packet in the manner described above, playback of audio/video data may be performed at an appropriate time without performing resource-intensive handshake operations or maintaining a PTP stack. The resource savings associated with removing the PTP stack from the talker device may be applied to the audio/video data transmission, thereby decreasing overall delays in the system.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109 and/or talker 202/listener 204 described with reference to FIGS. 1 and 2. The methods may be performed by executing stored instructions with one or more logic devices (e.g., processors) in combination with one or more additional hardware elements, such as storage devices, memory, hardware network interfaces/antennas, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A device comprising:
a communication interface communicatively connectable to another device and configured to transmit data;
a processor; and
a storage device that stores instructions executable by the processor to:
receive a stream packet;
extract a timestamp from the stream packet;
add one or more offsets to the extracted timestamp to determine a presentation time;
generate a media packet, the media packet including an indication of the determined presentation time and a media item to be played back at the determined presentation time; and
transmit the generated media packet,
wherein adding one or more offsets to the extracted timestamp includes adding a precision time protocol (PTP) offset to the extracted timestamp to determine a current PTP time and adding a presentation offset to the determined current PTP time to determine the presentation time,
wherein the stream packet is a clock reference stream packet received from an AVB PTP master device, and
wherein the extracted timestamp comprises a PTP time generated based on a master PTP clock in the AVB PTP master device, and where the device does not include a PTP stack for maintaining a PTP time.

2. The device of claim 1, wherein adding one or more offsets to the extracted timestamp includes adding a presentation offset to the extracted timestamp to determine the presentation time.

3. The device of claim 1, further comprising a transmission buffer, the instructions further executable to receive a plurality of audio samples from an audio source device, store the received plurality of audio samples in the transmission buffer, and retrieve one or more audio samples of the plurality of audio samples from the transmission buffer.

4. The device of claim 3, wherein the generated media packet includes the retrieved one or more audio samples.

5. The device of claim 1, wherein the generated media packet is a 1722a stream packet.

6. The device of claim 1, wherein the device is a talker device in an Ethernet AVB network, the instructions further executable to transmit the generated media packet to a listener device in the Ethernet AVB network.

7. A communication system comprising:
a talker device including:
a transmission buffer for storing audio/video data blocks for transmission, and
a storage device storing instructions executable by a processor of the talker device to determine a presentation time for a generated packet based on a timestamp extracted from a different, received packet and adjusted by one or more offsets, the generated packet including a media item; and
a listener device communicatively connected to the talker device and configured to receive the generated packet from the talker device,
wherein the talker device is configured to determine the presentation time by adding a precision time protocol (PTP) offset to the extracted timestamp to determine a current PTP time and adding a presentation offset to the determined current PTP time to determine the presentation time,
the communication system further comprising an AVB PTP master device, the extracted timestamp being extracted from a clock reference stream received at the talker device from the AVB PTP master device, the talker device not including a PTP stack for maintaining a PTP time.

8. The system of claim 7, wherein the AVB PTP master device further includes a master PTP clock, and wherein the extracted timestamp comprises a PTP time generated based on the master PTP clock.

9. The system of claim 7, wherein the talker device is configured to determine the presentation time by adding only a presentation offset to the extracted timestamp to determine the presentation time.

10. The system of claim 7, wherein the talker device is configured to receive a plurality of audio samples from an audio source device, store the received plurality of audio samples in the transmission buffer, and retrieve one or more audio samples of the plurality of audio samples from the transmission buffer.

11. The system of claim 10, wherein the media item included in the generated packet includes the retrieved one or more audio samples.

12. The system of claim 11, wherein the generated packet is a 1722a stream packet.

* * * * *